INVENTOR:
GERHARD E.A. FALK
BY:

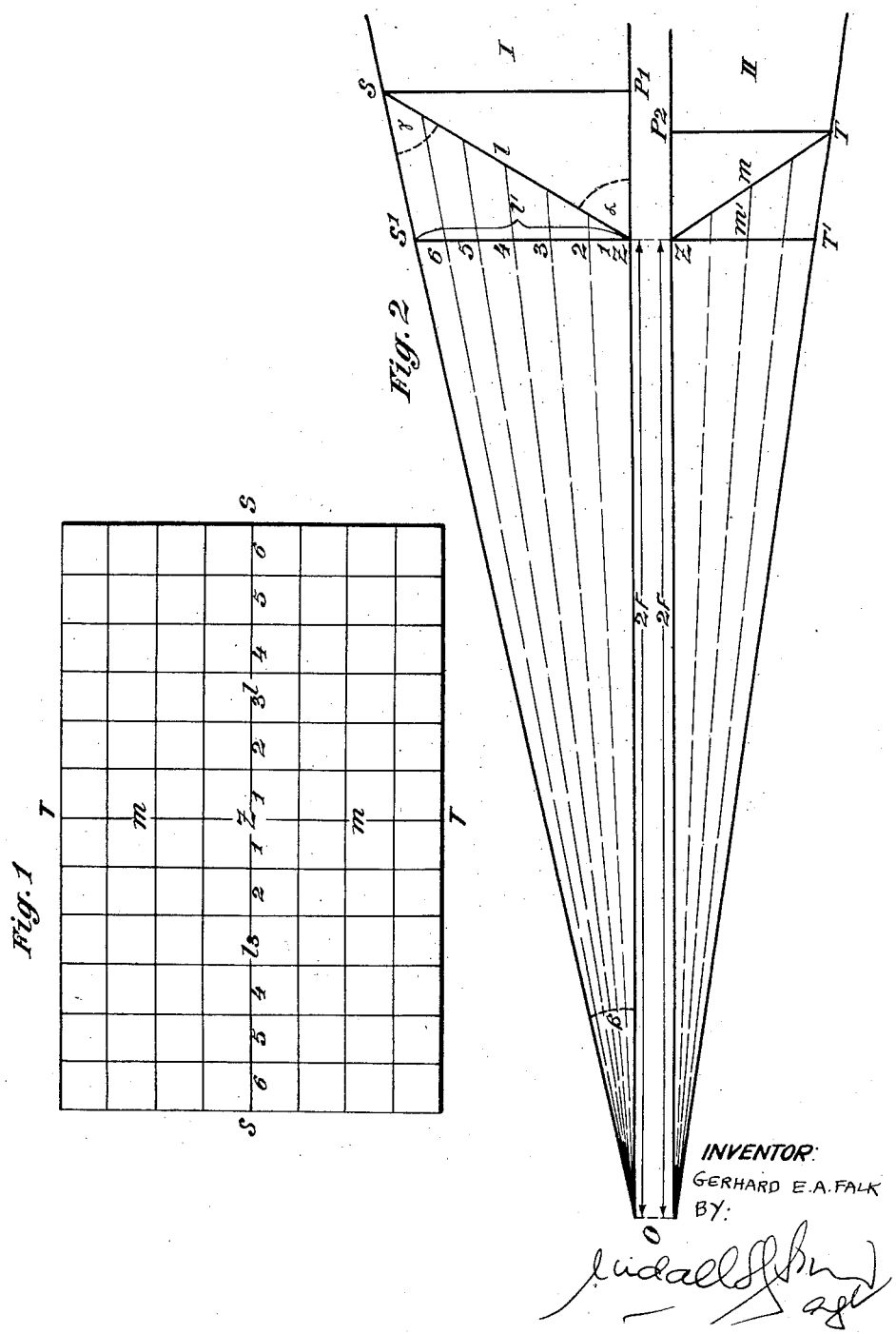

Sept. 1, 1953 G. E. A. FALK 2,650,517
PHOTOGRAPHIC METHOD FOR MAKING GEOGRAPHIC MAPS
Filed Feb. 10, 1949 11 Sheets-Sheet 3
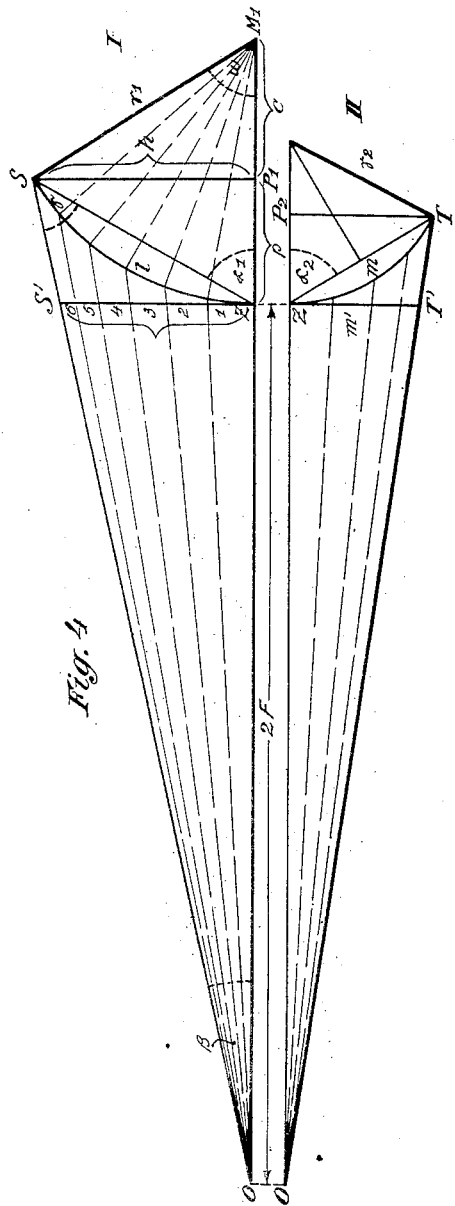
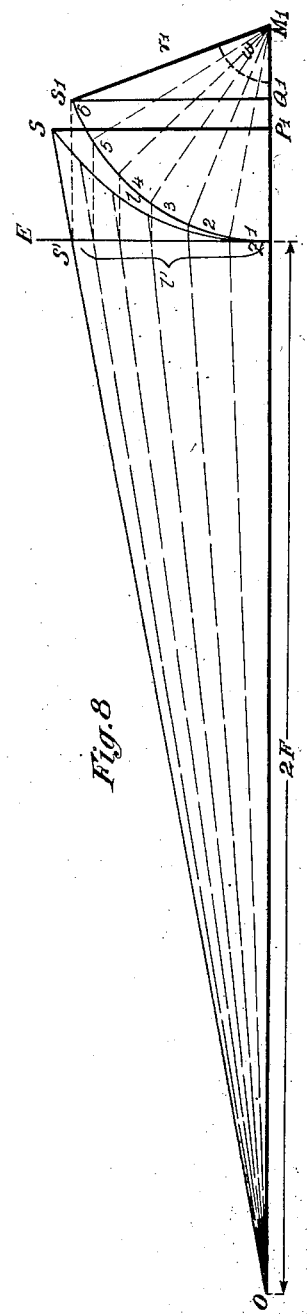
INVENTOR:
GERHARD E. A. FALK
BY

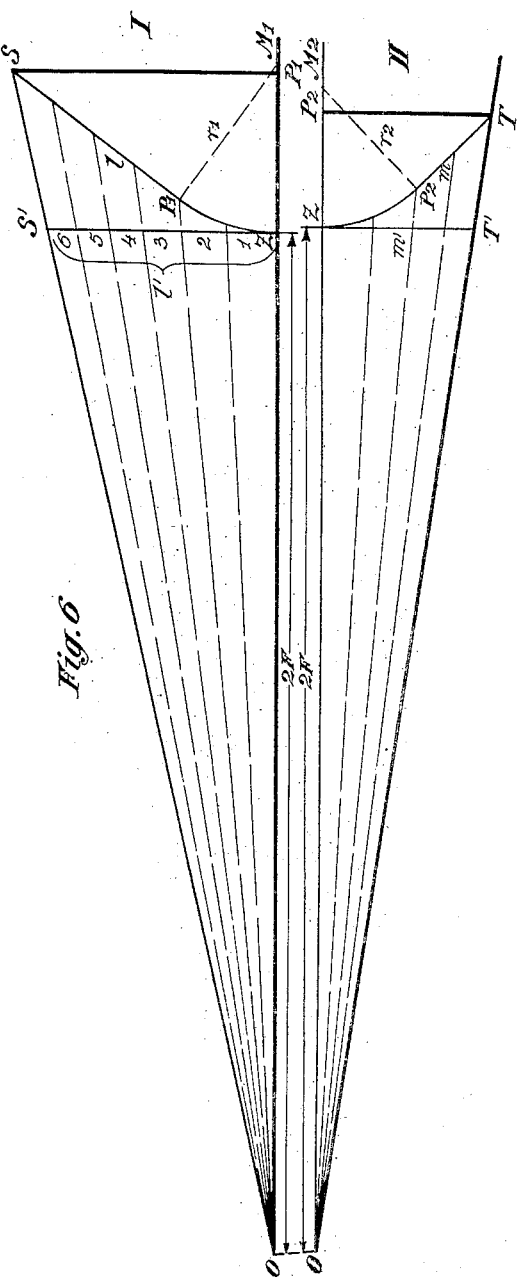

INVENTOR:
GERHARD E. A. FALK
BY:

Sept. 1, 1953 G. E. A. FALK 2,650,517
PHOTOGRAPHIC METHOD FOR MAKING GEOGRAPHIC MAPS
Filed Feb. 10, 1949 11 Sheets-Sheet 6

INVENTOR:
GERHARD E.A. FALK
BY:

Sept. 1, 1953 G. E. A. FALK 2,650,517
PHOTOGRAPHIC METHOD FOR MAKING GEOGRAPHIC MAPS
Filed Feb. 10, 1949 11 Sheets-Sheet 7

INVENTOR:
GERHARD E.A. FALK
BY:

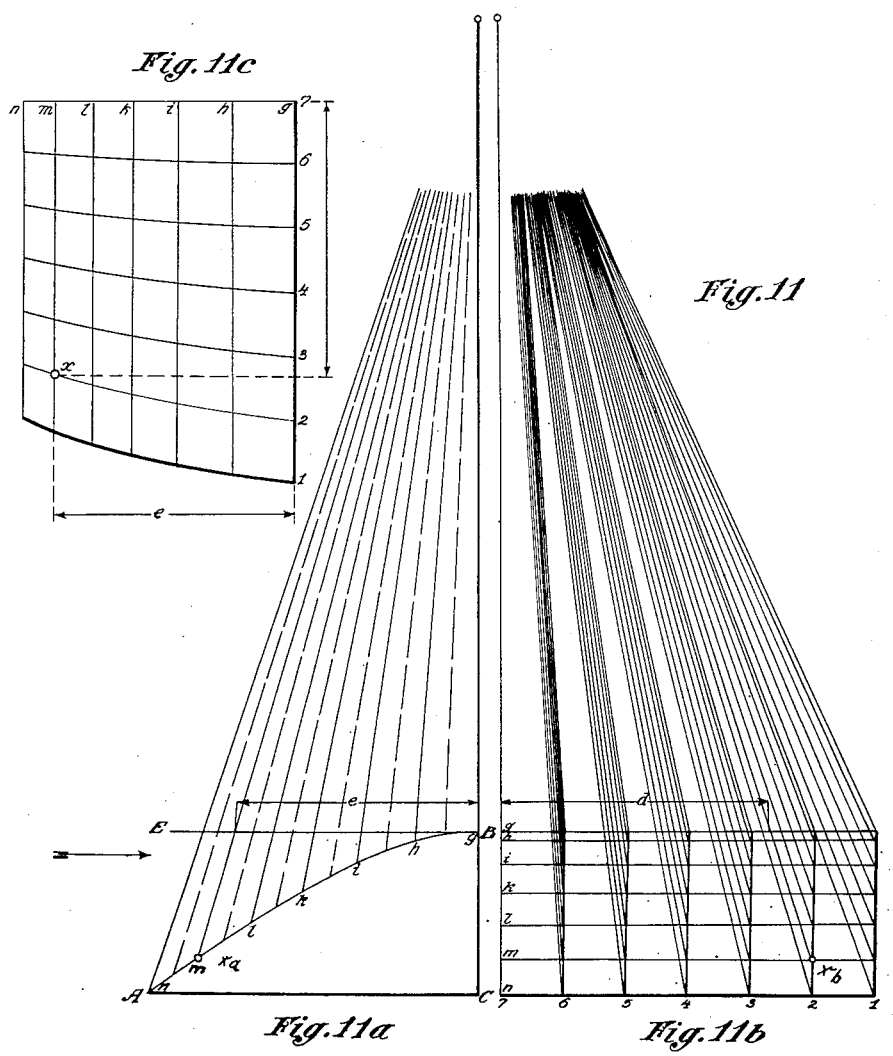

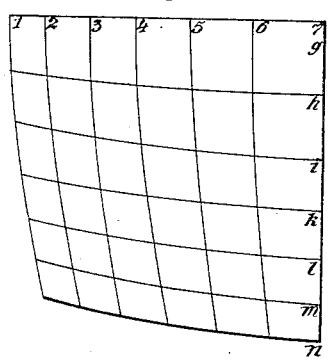
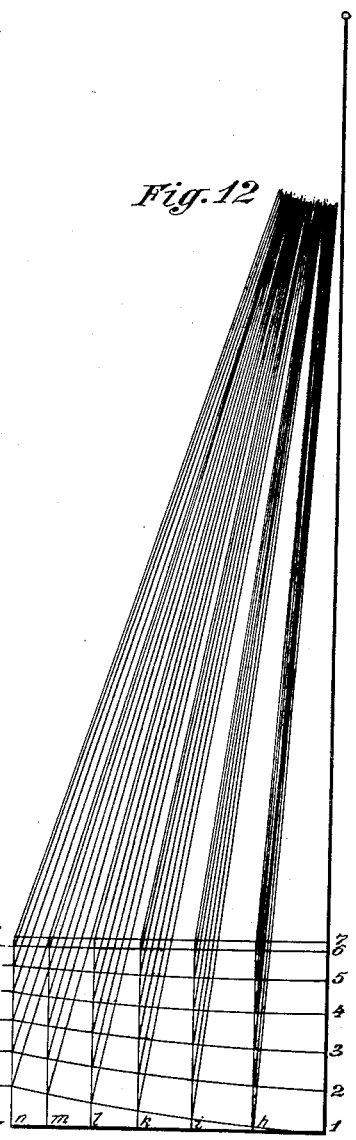
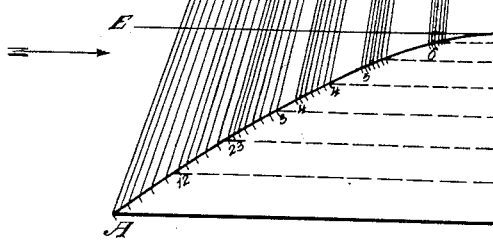

Sept. 1, 1953 G. E. A. FALK 2,650,517
PHOTOGRAPHIC METHOD FOR MAKING GEOGRAPHIC MAPS
Filed Feb. 10, 1949 11 Sheets-Sheet 11

INVENTOR:
GERHARD E.A. FALK
BY:

Patented Sept. 1, 1953

2,650,517

UNITED STATES PATENT OFFICE 2,650,517

PHOTOGRAPHIC METHOD FOR MAKING GEOGRAPHIC MAPS

Gerhard Ernst Albrecht Falk, Hamburg, Germany

Application February 10, 1949, Serial No. 75,656
In Great Britain August 27, 1948

7 Claims. (Cl. 88—24)

The invention relates to a geographical map, and more particularly but not exclusively to a town map, and to methods of making such maps.

In many cases localities, especially towns, consist of a densely built-up town centre, which merges gradually into suburbs, which are much less densely built-up. In order to be able to represent the streets, buildings, etc., on a town map, one is therefore forced to show localities in a relatively large scale, generally 1:10,000 to 1:20,000, although the less densely built-up districts outside the centre of the town would permit the use of a smaller scale without affecting the good legibility of the marking of the streets, etc. The maps of such localities are therefore generally unhandy and difficult to use; the frequent unfolding and folding up of a large map causes considerable wear. The division of a map into separate sheets, which are bound together in the form of a book, on the other hand, makes the map considerably more difficult to read.

The purpose of the invention is to eliminate these disadvantages. According to the invention, certain parts of the locality are illustrated on a relatively large scale, whereas the other parts of the locality are shown on scales which continuously decrease from the chosen maximum scale.

A map constructed according to the invention is preferably made by a distorted photograph of a map having an unvarying scale.

In general it will be sufficient and preferable if the distorted scale values have only one maximum. In this case the geometrical locus of the greatest scale is a point or a straight line.

The method of producing a map in which the geometrical locus of the greatest scale is a straight line comprises the steps of placing a map having an invariable scale parallel to a light sensitive surface, and of bending the map about a straight line in a plane parallel to said light sensitive surface so as to form two portions of the map which are arranged symmetrically to a plane normal to the light sensitive surface and passes through said straight line whereupon the map is projected on a light sensitive surface to produce a distorted photograph of the map.

In order to produce a map having a point as geometrical locus of the greatest scale, a distorted photograph showing a distorted map and produced by the above method is placed in a plane which is parallel to another light sensitive surface. Then the distorted photograph is bent out of the plane about a straight line which extends at an angle to the straight line representing the geometrical locus of the distorted map. The distorted map is then photographed on the other light sensitive surface whereby a map is produced which is distorted in two directions and has a point as geometrical locus.

The above mentioned photographs are preferably made in several steps, in that at each step the map is placed on an evolvable surface, such as a cylindrical surface and the photograph obtained thereby is placed on a further evolvable surface, at an angle to the first, and this photograph serves as the basis for the next step. It is generally sufficient if the photographs are made in two consecutive steps by means of two similar evolvable surfaces placed at right angles to each other.

In order to produce a geographical map, in which the geometrical locus of the largest scale is a point, the evolvable surfaces are preferably cylinders of which the cross-sections are conic sections, the vertices of which, if they are present, are so arranged that their distances from the point of projection are less than that of the other points of the conic section. If, in this case, the course of the conic section leads from a certain region to a too great diminution of the scale, then according also to the invention a tangent is drawn to the conic section from this region.

Instead of cylinders of which the cross-sections are conic sections, prisms having cross-sections in the form of polygons, of which the one corner is so arranged that its distance from the point of projection is less than that of the other corners, may be provided. Preferably a triangle is used as the polygon.

In order to produce approximately a geographical map, in which the locus of the greatest scale is a straight line, the map with the invariable scale is so placed on a prism that the points of the straight line in which the maximum scale is situated, lie at a smaller distance from the point of projection than the other points of the individual prism cross-sections. In a photographic projection the distance of the point of projection from the individual points of that straight line, which should be the locus of the greatest scale, is variable. In consequence the scale actually decreases along this straight line as the distances of individual points in this straight line from the point of projection increase. Here, too, conic sections, conic sections with tangents thereto, or polygons can be used as cross-sections for the prisms.

The accompanying drawings illustrate the invention, by way of example. In the drawings:

Figure 1 is a view of a lattice network of a town map;

Figure 2 is a diagrammatic illustration of a projection carried out according to the invention;

Figure 4 is a diagrammatic illustration of another projection carried out according to the invention;

Figure 6 is a diagrammatic illustration of a further projection carried out according to the invention;

Figure 8 is a diagrammatic representation explaining how an orthogonal sphere projection can be carried out photographically;

Figure 10:
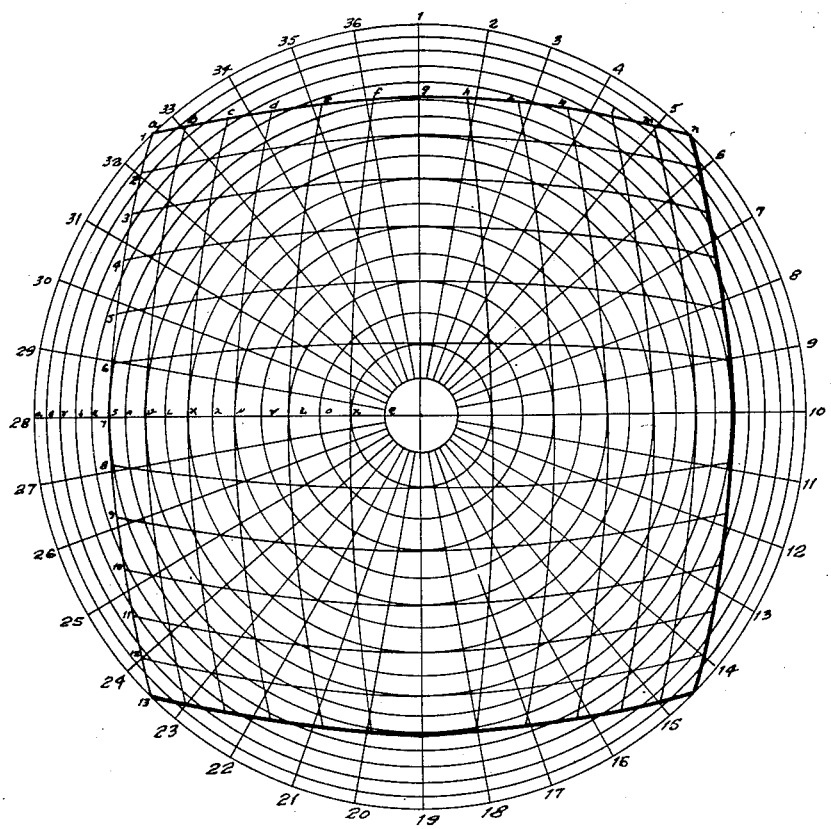
Figure 10 is an illustration showing the geometrical solution of a transformation of the square-network of Figure 9 made according to certain laws.
Figure 14:
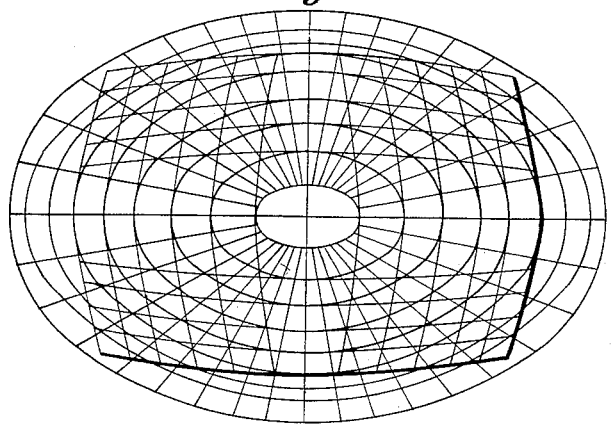
Figure 13:
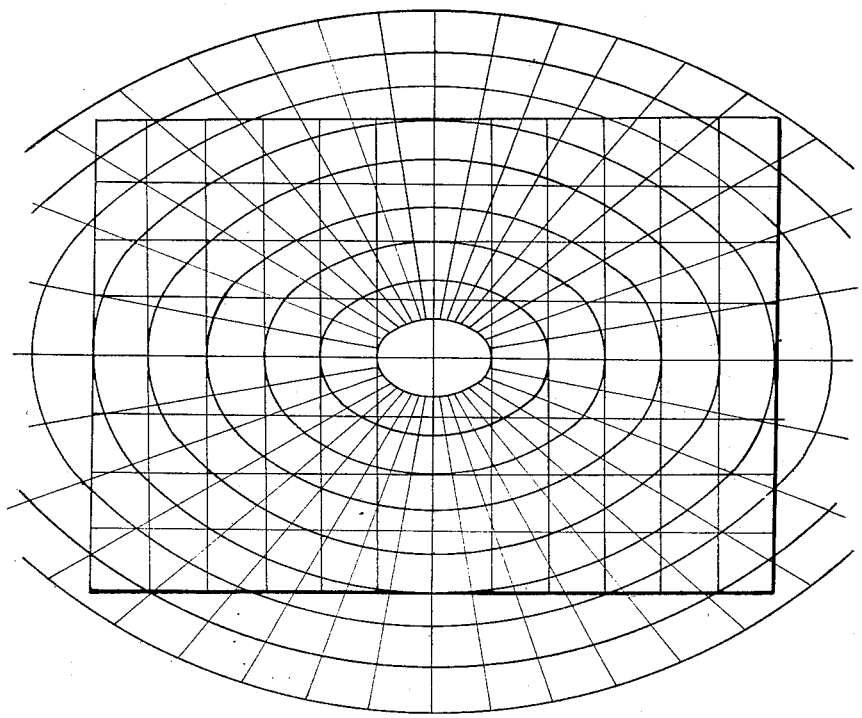
Figure 15:
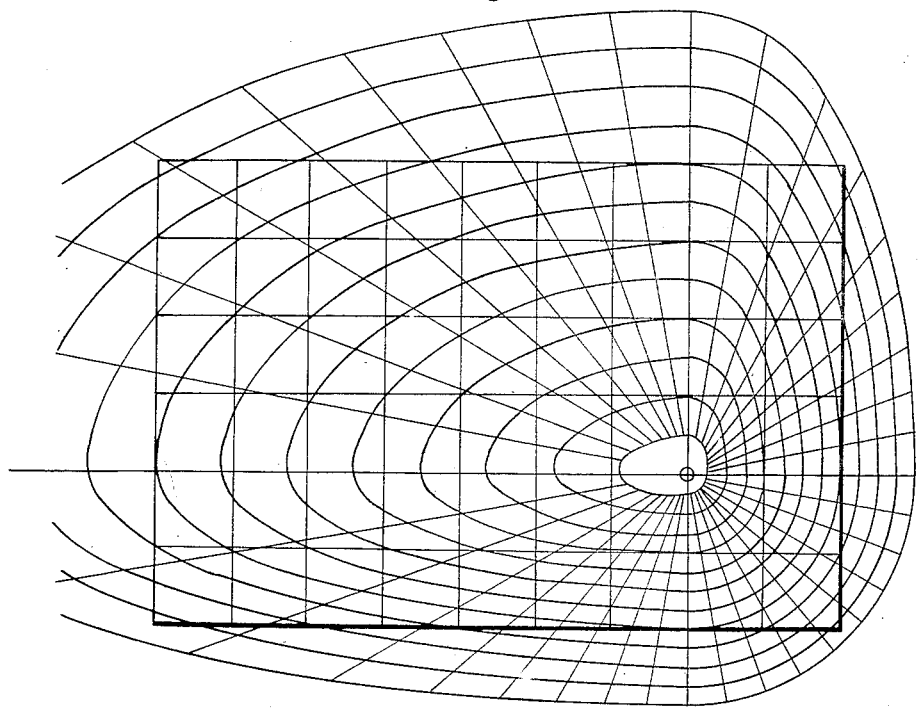
Figure 16:
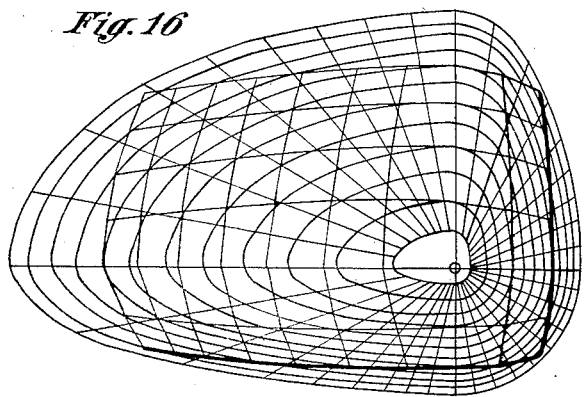

Figures 11a-c are an illustration of a method of determining geometrically the cross-section of the projection cylinder and the degree network for the first step in the photographic production of a square-network transformed according to Figure 10;

Figures 12a-c are an illustration of a method of determining geometrically the cross-section of the projection cylinder and the degree network of the second step in the photographic production of a square-network transformed according to Figure 10;

Figure 13 is an illustration of a square-network superimposed on an ellipse sector network;

Figure 14 is an illustration showing the geometrical solution of a transformation of the square-network of Figure 13 carried out according to certain laws;

Figure 15 is an illustration of a square-network, which is superimposed in part on a circle sector network and in part on an ellipse sector network, three ellipses of different signs being used;

Figure 16 is an illustration showing the geometrical solution of a transformation of the square-network of Figure 15 carried out according to certain laws.

In Figure 1 is shown an orthogonal lattice network intended for a cartographic representation, the squares of which are equally large in all sections and therefore represent a map having the same scale everywhere. The network shown has a height TZT and a width SZS, the point Z bisecting the lines $SS = 2l$ and $TT = 2m$.

The network has for the purpose of the invention to be so distorted that the scale decreases from the centre Z to the edges to an approximately equal extent.

In the example both the distances $ZS = l$ are divided into six equal parts, which are marked consecutively with the numbers 1 to 6.

In Figure 2 it is assumed that $SZ = l$ gradually decreases to $S'Z = l' = 3/4\, l$. Correspondingly $TZ = m$ should decrease to $T'Z = m' = 3/4\, m$. In this example the map with the lattice network of Figure 1 is placed on the face ZS of a prism having a triangular cross-section, the one half of which is represented in the upper part I of Figure 2 by the triangular area $ZSP_1$. The map is placed in such a way that the line TZT of Fig. 1 appears as a point Z in Figure 2.

The map of Figure 1 is then photographed through a lens O, and the image thus obtained, the axis TT of which has not been shortened, is placed on the face ZT of a prism also of triangular cross-section, the one half of which is represented in the lower part II of Figure 2 by the triangular area $ZTP_2$. In this case the map must be so arranged that line SZS which has been shortened by the preceding photographical projection is perpendicular to the plane of the drawing. The photograph, which is now taken gives a lattice network having the desired reduction of scale in which $m$ is continuously shortened to $3/4\, m = m'$ and $l$ to $3/4\, l = l'$.

The selection of the point of projection O depends on the focal length of F of the objective lens of the camera used for the photograph. Its distance from the map centre Z, which lies on the vertices of the two prisms which face the point O and have the above described triangular cross-sections, the halves of which are equal to the triangles $ZSP_1$ and $ZTP_2$, is $2F$, if the photograph is to be in natural size. The nearer the point of projection moves to the prisms, using, for example, a wide-angle objective, the greater is the perspective distortion of the lattice network, that is the nearer the outer edges of the map move towards the map centre in the projection.

In Figure 2 ZS and ZT are sections through the plane of the map and ZS' and ZT' are sections through the projection plane. Using the symbols shown in Figure 2, the following equations are obtained $$\sphericalangle a = \sphericalangle \beta + \sphericalangle \delta$$

and, according to the sine law, $$\sin \delta = \frac{2F \times \sin}{1}$$

The lattice network of Figure 1 has in the manner described been placed in two successive steps over two prisms perpendicular to each other. This has the same effect as if the lattice network of Figure 1 had been placed in one step on a four-sided pyramid, the half longitudinal section of which in the one direction is equal to the triangular area $SZP_1$ and the half longitudinal section in the direction perpendicular to it is equal to the triangular area $ZTP_2$. This method of carrying the invention into effect is hereinafter called pyramid projection.

Figure 3:
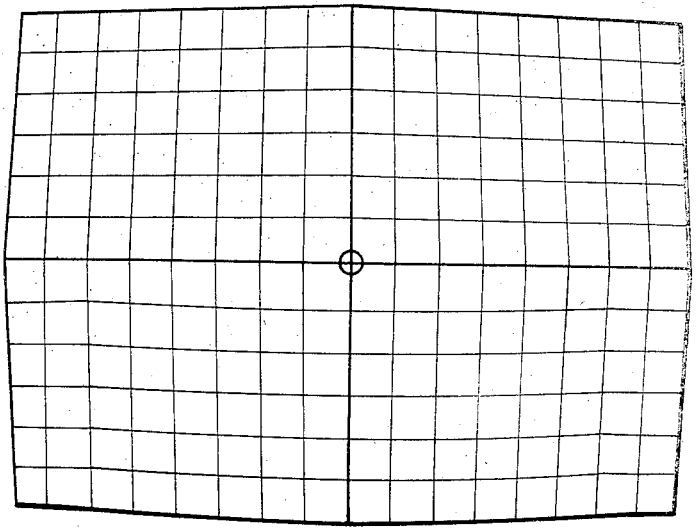
Figure 3 is a lattice network which has been similarly distorted by the method illustrated in Figure 2.

Figure 3 shows the transformation of the lattice network obtained by this method. It will be seen from this that decrease of the scale starts in the map centre Z and proceeds uniformly to the map edges. The lattice lines thus produced have a visible kink or bend in the two map axes. In Figure 3 the scale decreases from 1:11,300 in the centre of the map to 1:13,000 at its edges.

The pyramid projection is especially suitable for the carto-graphical representation of towns, the densely built-up area of which is only of small extent. If the densely built-up parts of the town extend more or less along a straight line, the lattice network of Figure 1 needs only to be placed on a single prism having a triangular cross-section and projected only once.

In another method of carrying out the invention the lattice network of Figure 1 is placed for the first photographic projection on a cylinder I (Figure 4) having the radius $r_1$, which is so calculated that, for example, $l'=3/4l$ again. For the second photograph the map is placed on the cylinder II, the radius $r_2$ of which is so calculated that for example $m'=3/4m$ again. This method of carrying out the invention is hereinafter called bi-cylinder projection. The same distance of the projection point from the map centre $OZ=2F$ is used as basis for the projection as in the case of pyramid projection.

If it be assumed that in Figure 4 the length of the chord ZS is equal to the arc $ZS=l$, we obtain for the approximate calculation of the radii of the two cylinders $$r_1 = \frac{l}{2 \cos \alpha_1}$$

$$r_2 = \frac{m}{2 \cos \alpha_2}$$

Similarly as described in connection with Figure 2

$$\sphericalangle \alpha = \sphericalangle \beta + \sphericalangle \delta$$

$$\tan \beta = \frac{l'}{2F}$$

$$\sin \delta = \frac{2F \sin \beta}{l}$$

For the calculation of the scales of the projected map, the following relations hold good $$l' = 2F \tan \beta$$

$$c = r_1 \cos \omega$$

$$p = r_1(1 - \cos \omega)$$

$$l' = \frac{2F r_1 \sin \omega}{2F + r_1(1 - \cos \omega)}$$

$$\omega = \frac{l.180°}{\pi.r_1}$$

Figure 5:
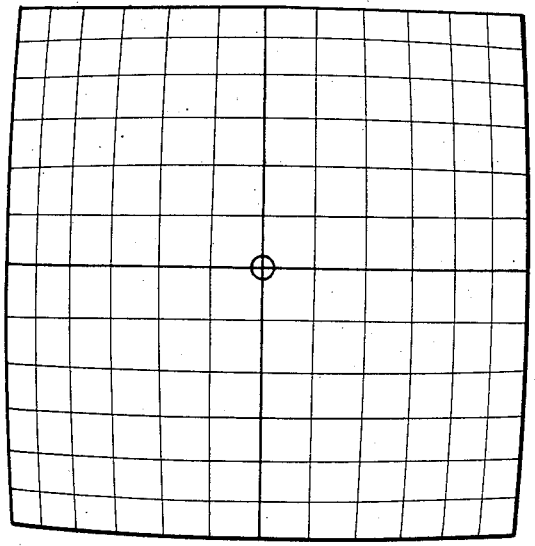
Figure 5 is a lattice network which has been similarly distorted by the method illustrated in Figure 4.

Figure 5 shows a lattice network transformed by means of a bi-cylinder projection, the scale of which is in the centre at Z equal to 1:10,000 and at the edges 1:16,000. Since the map is square and not rectangular the two cylinders used in the bi-cylinder projection have equal radii.

The decrease of the scale is only very small in the vicinity of the map centre in this projection, but all the greater at the map edges. It is therefore especially well suited for the cartographical representation of a town having an extensive, densely built-up centre and scattered built-up outlying districts.

In a further form of carrying out the invention the map of Figure 1, is as shown in Figure 6, first placed for photographing on a body I, which is composed of a cylinder segment with relatively small radius $r_1$ and a plane tangentially touching the cylinder segment. After this a photograph is taken on a similarly shaped body II with the radius $r_2$. The amount of distortion is dependent on the size of the radius of the cylinder segment and the position of the line along which the tangent plane touches the cylinder segments (that is the positions of $P_1$ and $P_2$ in the cross-section of Figure 6). The amount of the distortion may be selected, for example, so that $l'=3/4l$ with reference to the body I and that $m'=3/4m$ with reference to body II. In Figure 6, $M_1P_1=r_1$=radius of the projection cylinder I,
$P_1S$=section through the tangential plane on the projection cylinder I,
$M_2P_2=r_2$=radius of the projection cylinder II,
$P_2T$=section through the tangential plane on the projection cylinder II.

Figure 7:
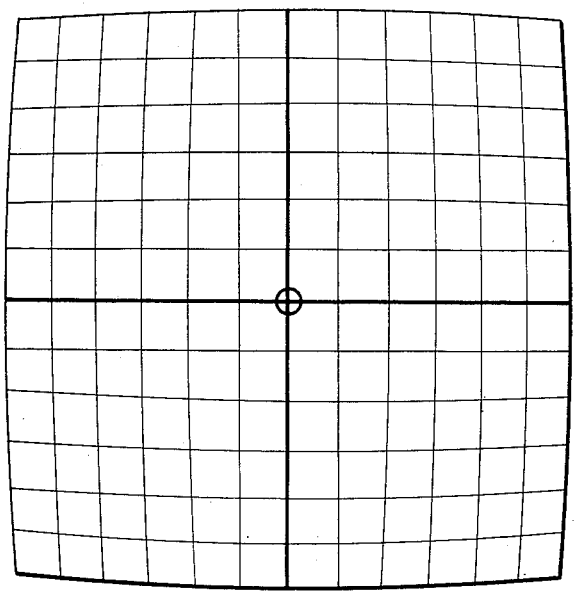
Figure 7 is a lattice network which has been similarly distorted by the method illustrated in Figure 6.

Figure 7 shows a lattice network, which has been transformed in the manner explained with reference to Figure 6. Owing to the cross-section of the body used in this transformation this method of carrying out the invention is hereinafter called cylinder tangent projection. It will be seen from Figure 7 that the cylinder tangent projection is intermediate between the pyramid projection of Figure 3 and the bi-cylinder projection of Figure 5. Whilst in the bi-cylinder projection of Figure 5 the scale decreases only very slightly in a relatively large circle around the map centre, this region of an only very slight scale decrease is considerably smaller in the cylinder tangent projection of Figure 7. In the region of the tangential plane the scale decrease increases uniformly up to the map edges. The cylinder tangent projection is therefore suitable especially for the representation of localities with small inner built-up areas and relatively slightly spread out outer districts.

All projections can be used not only if the densely built-up centre of the town lies in the centre of the map, but can be carried out for all asymmetrical cases, in which, therefore, the densely built-up centre of the town, for the representation of which a larger scale is desirable, lies outside the centre of the map.

Furthermore, ellipsoids, paraboloids and hyperbloids can be used as projection bodies. The selection of the projection body, of its dimensions and of the distance of the point of projection from the projection body depends in all cases on the character of the town to be pictured and on the desired size of map.

For the sake of completeness it may be pointed out that other scales are used as basis for the lattice network of Figures 3, 5 and 7 than for the drawings of Figures 1, 2 4 and 6.

It will often be advantageous to project the map to be transformed from a globe or sphere, since this projection is easy and simple to calculate for all sizes of maps. Figure 8 shows how an orthogonal globe projection may be carried out photographically. In this figure a part of a sphere with the radius $r_1$, which is shown in section is projected orthogonally onto a plane E which is tangent to the sphere. In this projection the arch of the sphere $S_1Z=l$ is distorted into $S'Z=l'$. This distortion increases as the angle $\omega$ increases, for which reason this angle can be called the angle of distortion. The projection of an arc is always $l'=r_1 \sin \omega$. The quotient $q=l/l'$ is called the quotient of distortion and is constant for a certain angle $\omega$. It can be determined from a table for $\omega=0°$ to $90°$. On the basis of Figure 8, the following equations are obtained:

(1) $\qquad l = \frac{r_1.\omega°.\pi}{180°} (SZ=S_1Z=l)$ (2) $\qquad l' = r_1 \sin \omega (S'Z=l')$ (3) $\qquad \frac{l}{l'} = \frac{\pi.\omega°}{180°.\sin \omega} = q$ (quotient of distortion)

(4) $\qquad r_1 = \frac{l.180°}{\pi.\omega°}$

In order to be able to carry out the orthogonal projection of Figure 8 photographically, two alterations must be made:

(1) Since the map to be distorted cannot be placed on a sphere, it is placed on a cylinder with a radius of curvature $r_1$ equal to that of the sphere and shortened by double photographical projection, in that the map is projected once with the north-south direction vertical and the second time with the north-south direction, horizontal by which means the effect of a globe projection is obtained;

(2) Since no parallel projection can be made photographically, the point of projection O must be displaced from the infinite to the finite. For this purpose a projection body of the cross-section $SZP_1$ is constructed on to which the map to be distorted of the half length $SZ=l$ is placed and when photographed the same distortion $S'Z=l'$ results as the orthogonal projection of the cylinder section $S_1ZM_1$ produces.

In order to obtain the curve SZ of the desired projection body, the point of projection O is on the one hand connected to the points of intersection of the lattice lines of the projected map S'Z; and these projection lines are prolonged beyond the projection plane E. In the example, the map is divided into six equal parts 1 to 6 so that, if the projection lines OZ and OS' running to the edge are added, there are seven projection lines present.

Now the map is placed in such a way that the prolongation of the individual projection lines with the relevant lattice lines of the map comes to the point of intersection. For this purpose an arc of a circle is struck around Z with radius 1/6 $l$ (that is the length of a side of a lattice square), which cuts the corresponding projection beam at a point, which is a point in the cross-section line SZ of the desired projection body. Around this point an arc of a circle is again struck with the same radius 1/6, the point of intersection of which with the prolongation of the next projection beam gives a second point of the curve. The continuation of this process finally gives the whole line SZ, which represents a cross-section line through the desired projection body $SZP_1$. The greater the number of the lattice squares, the smaller is their size, and therefore the greater is the accuracy of the method. The map to be distorted is placed on this projection body and shortened by photographic double projection as above described.

If a map with an orthogonal lattice network (Figure 1) is to be so shortened that the size of the map is to be 25% smaller, the suitable angle must be found from the above-described table giving the quotient of distortion for $q=l/l'$. For the reduction $q=4/3=1.3$, the angle $\omega=70°$. According to the above equation 4, by inserting for $l$ half the length of the map and 70° for the value of $\omega$, one obtains the radius $r_1$ of the cylinder on to which the map must be placed, in order to obtain in parallel projection the desired reduction of the size by distortion of the scale. If the distance of the top edge of the map from the centre of the map represents 6 km. on the ground, that is six lattice squares with a side 1/6 $l$, the points of intersection of the lattice lines are found on the projection plane E, in that the individual values for $l'$ are calculated according to the above Equation 2 for the values $\omega=70°/6$, $\omega=2.70°/6$ etc. If the number of lattice squares is equal to $n$ the scale of the edge can be calculated from $$l'_n - l'_{n-1}$$

the side of the last square. By comparison with the scale of the centre of the map, which is approximately equal to the scale of the original, one can then ascertain whether the degree of distortion can be used for the desired purpose.

In this way the radius of the cylinder can be calculated for asymmetrical cases, in which the densely built-up centre of the town does not lie in the centre of the map, in that, while maintaining the angle of distortion and thus the same scale at the edge, the distance of the centre of the town from the edge of the map is inserted in the above Equation 4 for $l$ and thus for each map quadrant the radius of the cylinder section is calculated, and then the points of intersection of the lattice lines in the plane of projection are calculated in accordance with Equation 2 and after that the projection body is constructed.

The sphere projection is, of course, very similar in its character to the bi-cylinder projection described with reference to Figures 4 and 5, of which it represents merely a special case. For $q=\pi/2$ one obtains, for example, with a scale in the centre of the map of 1:10,000 a scale distortion at the edges of 1:110,000, which in practice could scarcely be used.

Figure 9:
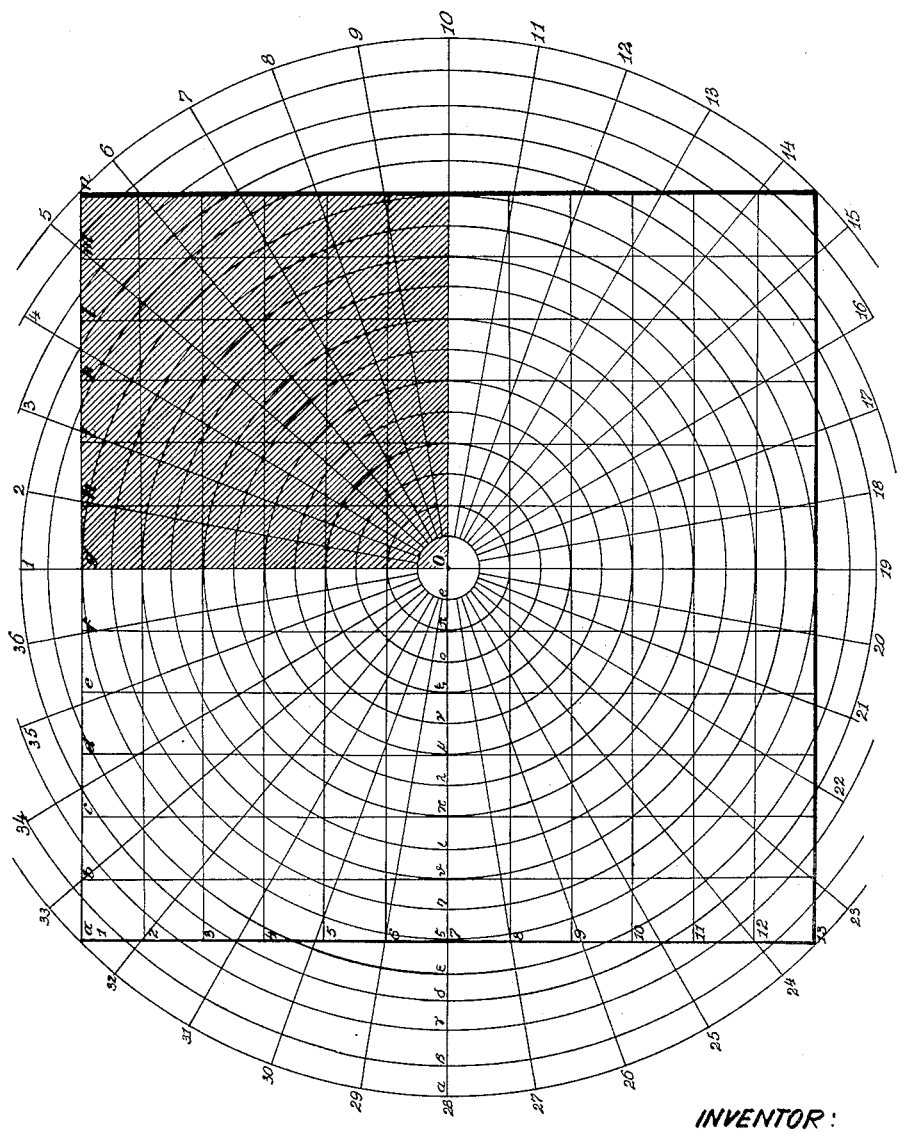
Figure 9 is an illustration of a square network superimposed on a circle sector network.

The network of squares shown in Figure 9, for example, is to be so transformed that after carrying out the transformation the scale at the edges of the network is half as large as in the centre. The alteration of the scale should proceed continuously from the centre and be the same in all directions. It is also necessary that the alteration of the scale is in proportion to a power of the distance from the centre point. This means with the references of Figure 9 that on the line 7 of the square network the following relations hold good:

$$gh:hi=hi:ik=ik:kl \text{ etc.}$$

and $mn=\frac{1}{2}gh$.

In order to solve this problem geometrically the square network is, as shown in Figure 9, superimposed on a circle sector-network, wherein the number of circles is equal to $n$ and the distances between two consecutive circles are constant. The sectors also always include equal angles.

The circle network is now transformed in the required way. Whole circles lie in the square network. A number $x$ has to be found such that $$x^n=\frac{1}{2}, \text{ that is to say}$$

$$x=\sqrt[n]{0.5}$$

If the distance apart of the circles is C, then after the transformation it is $C.x^k$, where $k$ is the order number of the relevant circle. Hence the radii of the circles are $$\epsilon=\sum_{V=1}^{k}C \cdot x^V$$

The angle of the sectors remains unchanged in the transformation. In this way the circle sector network of Figure 10 is produced, into which the square network is now plotted by points.

The distortion error of course increases with $k$ and is greatest in the direction of the periphery of the circle to be examined.

The problem now is to carry out this transformation of the lattice network of Figure 9 photogeometrically. Photography may be considered fundamentally as central projection, where the stop constitutes the projecting point. In this case it does not matter whether in the observation the image (on the plane of projection E) and the object lie on one side of the projecting point or are separated by it. The following consideration refers to the first case.

The radial straight line shortening is given by the preceding considerations, that by the fact that the straight lines are as follows:

$$gh:hi=hi:ik=ik:kl \text{ etc.}$$

In the following only the hatched square at the top right hand of the whole lattice square network of Figure 9 is projected.

Figure 11 is given for explaining a method by which the cross-section of the projection cylinder and the degree network is determined for the first step in the photo-geometrical production of a square network transformed according to Figure 10. In the left half 12a of this figure the cross-section of the hyperboloid is represented by ABC, on the hyperboloid surface AB of which the hatched part of Figure 9 is so placed that the straight line $g$ lies at right angles to the plane of the drawing. Instead of this one could also start with the straight line 7 lying at right angles to the plane of the drawing. A cross-section through the projection surface is represented by the line E, on which, starting from the point B, the radial distances shortened in accordance with the above given law are plotted.

Whereas in the Figures 9 and 10 the radial distance is subdivided seventeen times, the last 5 parts are omitted in Figure 11. Now the individual section points on the line E are connected to the projection point O and extended beyond the line E. Now a circle is drawn around B with a radius, which is equal to the undistorted unit section of a radial ray. This circular arc meets the first projection ray at a point on the hyperbolic surface AB of the cross-section of the hyperboloid ABC. A circle is now drawn with the radius around this point, which meets the next projection ray in a further point of the curve AB. The continuation of this process finally gives the whole course of the curve AB and thus the cross-section of the hyperboloid ABC. The right-hand part 11b of Figure 11 shows a view of the diagram of Figure 11 viewed in the direction of the arrow. The straight lines $h, i, k, l, m$ and $n$ are also marked on the curve AB, $n$ coinciding with the point A.

From Figure 11b one obtains the projection of the square network, which is shown in 11c and with it is ended the first step of the method. Each point of intersection in the square network of Figure 9 corresponds to a point of intersection of the square network of Fig. 11b. The individual points of intersection are connected to the projection point O of Figure 11b in exactly the same manner as the projections of these points of intersection on the curve AB are connected to the projection point. The individual points of the projected image of Figure 11c are given by the points of intersection of these projection rays with the projection plane. By way of explanation, any point X in Figure 11c is assumed which is indicated in Figure 11b by $X_b$ and in Figure 11a by $X_a$. The point X in Figure 11c is given by the line $d$ of Figure 11b and the line $e$ of Figure 11a. The other points of the lattice network of Figure 11c are found in corresponding manner.

The lattice network of Figure 11c is placed on the same cylinder with the hyperbolic surface AB in such a way that the line 7 lies in the point B perpendicularly to plane of the drawing. A projection from the projection point O on to the projection plane E is now made of the lattice network thus formed. In this way the final transformed lattice network of Figure 12c is obtained, which agrees with the transformed lattice network shown in Figure 10. Graphically the lattice network of Figure 12c may be obtained from Figures 12a and 12b in the same way as the lattice network of Figure 11c was obtained from Figures 11a and 11b. For the determination of Figure 12c the method is only somewhat more complicated, since the lines 1 to 6 are no longer parallel to each other and to the line 7. Owing to this in Fig. 12a the points of intersection of the individual lines 1, 2, 3, 4, 5, 6 and 7 with the lines $g$ to $n$ are projected in individual points, in the example therefore in seven points, whereas these points of intersection in Figure 11a are projected only in one point each.

By similar principles it is possible to make a photographic projection for lattice networks, which are to be transformed according to any laws whatever.

Figure 13 shows square network which has been superimposed on an ellipse sector network. Figure 14 shows the square network transformed according to the invention, the transformation having been carried out according to the same laws as that of Figure 10 and Figure 12c.

Figure 15 shows a similar square network, which has been superimposed on four sectors each of 90°. The sector at the right-hand bottom corner is a sector of a circle, whereas the other three sections are ellipse sectors, the ellipses of which have parameters of different sizes.

Figure 16 shows the transformed square network, the transformation having been carried out according to the same laws as those of Figures 10, 12c and 14.

I claim:

1. A method for producing a geographical map having a scale gradually decreasing in all directions, comprising in combination, the steps of placing a flat map having an invariable scale with a straight line in the plane thereof parallel to a light sensitive surface; bending the map about said straight line out of said plane parallel to said light sensitive surface and away from the same into two portions arranged symmetrically to a plane passing through said straight line normal to said light sensitive surface, and projecting the map on said light sensitive surface whereby a distorted reproduction is produced showing the map at a scale gradually decreasing in two opposite directions normal to and away from said line; placing a map produced by the above method with another straight line in the plane thereof and extending at an angle to said first-mentioned straight line and crossing the same parallel to another light sensitive surface; bending said map produced by the above method about said other straight line out of said plane parallel to said other light sensitive surface and away from the same into two portions arranged symmetrically to a plane passing through said other straight line normal to said other light sensitive surface; and projecting said map produced by said above method on said other light sensitive surface whereby a distorted reproduction is produced showing the map at the scale gradually decreasing from the point of intersection between said straight line and said other straight line.

2. A method for producing a geographical map having a scale gradually decreasing in all directions, comprising in combination, the steps of placing a flat map having an invariable scale with a straight line in the plane thereof parallel to a light sensitive surface; bending the map about said straight line out of said plane parallel to said light sensitive surface and away from the same into two straight portions arranged symmetrically to a plane passing through said straight line normal to said light sensitive surface, and projecting the map on said light sensitive surface whereby a distorted reproduction is produced showing the map at a scale gradually decreasing in two opposite directions normal to and away from said line; placing a map produced by the above method with another straight line in the plane thereof and extending at an angle to said first-mentioned straight line and crossing the same parallel to another light sensitive surface; bending said map produced by the above method about said other straight line out of said plane parallel to said other light sensitive surface and away from the same into two straight portions arranged symmetrically to a plane passing through said other straight line normal to said other light sensitive surface; and projecting said map produced by said above method on said other light sensitive surface whereby a distorted reproduction is produced showing the map at the scale gradually decreasing from the point of intersection between said straight line and said other straight line.

3. A method for producing a geographical map having a scale gradually decreasing in all directions, comprising in combination, the steps of placing a flat map having an invariable scale with a straight line in the plane thereof parallel to a light sensitive surface; bending the map about said straight line out of said plane parallel to said light sensitive surface and away from the same into two arcuate portions arranged symmetrically to a plane passing through said straight line normal to said light sensitive surface, and projecting the map on said light sensitive surface whereby a distorted reproduction is produced showing the map at a scale gradually decreasing in two opposite directions normal to and away from said line; placing a map produced by the above method with another straight line in the plane thereof and extending at an angle to said first-mentioned straight line and crossing the same parallel to another light sensitive surface; bending said map produced by the above method about said other straight line out of said plane parallel to said other light sensitive surface and away from the same into two arcuate portions arranged symmetrically to a plane passing through said other straight line normal to said other light sensitive surface; and projecting said map produced by said above method on said other light sensitive surface whereby a distorted reproduction is produced showing the map at the scale gradually decreasing from the point of intersection between said straight line and said other straight line.

4. A method for producing a geographical map having a scale gradually decreasing in all directions, comprising in combination, the steps of placing a flat map having an invariable scale with a straight line in the plane thereof parallel to a light sensitive surface; bending the map about said straight line out of said plane parallel to said light sensitive surface and away from the same into two portions having the shape of a conic section arranged symmetrically to a plane passing through said straight line normal to said light sensitive surface, and projecting the map on said light sensitive surface whereby a distorted reproduction is produced showing the map at a scale gradually decreasing in two opposite directions normal to and away from said line; placing a map produced by the above method with another straight line in the plane thereof and extending at an angle to said first-mentioned straight line and crossing the same parallel to another light sensitive surface; bending said map produced by the above method about said other straight line out of said plane parallel to said other light sensitive surface and away from the same into two portions having the shape of a conic section arranged symmetrically to a plane passing through said other straight line normal to said other light sensitive surface; and projecting said map produced by said above method on said other light sensitive surface whereby a distorted reproduction is produced showing the map at the scale gradually decreasing from the point of intersection between said straight line and said other straight line.

5. A method for producing a geographical map having a scale gradually decreasing in all directions, comprising in combination, the steps of placing a flat map having an invariable scale with a straight line in the plane thereof parallel to a light sensitive surface; bending the map about said straight line out of said plane parallel to said light sensitive surface and away from the same into two portions having the shape of a conic section with the vertex thereof placed in said straight line arranged symmetrically to a plane passing through said straight line normal to said light sensitive surface, and projecting the map on said light sensitive surface whereby a distorted reproduction is produced showing the map at a scale gradually decreasing in two opposite directions normal to and away from said line; placing a map produced by the above method with another straight line in the plane thereof and extending at an angle to said first-mentioned straight line and crossing the same parallel to another light sensitive surface; bending said map produced by the above method about said other straight line out of said plane parallel to said other light sensitive surface and away from the same into two portions having the shape of a conic section with the vertex thereof placed in said other straight line arranged symmetrically to a plane passing through said other straight line normal to said other light sensitive surface; and projecting said map produced by said above method on said other light sensitive surface whereby a distorted reproduction is produced showing the map at the scale gradually decreasing from the point of intersection between said straight line and said other straight line.

6. A method for producing a geographical map having a scale gradually decreasing in all directions, comprising in combination, the steps of placing a first map having an invariable scale with a straight line in the plane thereof parallel to a light sensitive surface; bending the map about said straight line out of said plane parallel to said light sensitive surface and away from the same into two portions having the shape of a conic section with the vertex thereof placed in said straight line and ending in a tangent thereof arranged symmetrically to a plane passing through said straight line normal to said light sensitive surface, and projecting the map on said light sensitive surface whereby a distorted reproduction is produced showing the map at a scale gradually decreasing in two opposite directions normal to and away from said line; placing a map produced by the above method with another straight line in the plane thereof and extending at an angle to said first-mentioned straight line and crossing the same parallel to another light sensitive surface; bending said map produced by the above method about said other straight line out of said plane parallel to said other light sensitive surface and away from the same into two portions having the shape of a conical section with the vertex thereof placed in said other straight line and ending in a tangent thereof arranged symmetrically to a plane passing through said other straight line normal to said other light sensitive surface; and projecting said map produced by said above method on said other light sensitive surface whereby a distorted reproduction is produced showing the map at the scale gradually decreasing from the point of intersection between said straight line and said other straight line.

7. A method for producing a geographical map having a scale gradually decreasing in two directions, comprising in combination, the steps of placing a flat map having an invariable scale with a straight line in the plane thereof parallel to a light sensitive surface; bending the map about said straight line out of said plane parallel to said sensitive surface and away from the same into two portions arranged symmetrically to a plane passing through said straight line normal to said light sensitive surface, and projecting the map on said light sensitive surface whereby a distorted reproduction is produced showing the map at a scale gradually decreasing in two opposite directions normal to and away from said line; placing a map produced by the above method with another straight line in the plane thereof and extending at an angle of 90° to said first-mentioned straight line and crossing the same parallel to another light sensitive surface; bending said map produced by the above method about said other straight line out of said plane parallel to said other light sensitive surface and away from the same into two portions arranged symmetrically to a plane passing through said other straight line normal to said other light sensitive surface; and projecting said map produced by said above method on said other light sensitive surface whereby a distorted reproduction is produced showing the map at the scale gradually decreasing from the point of intersection between said straight line and said other straight line.

GERHARD ERNST ALBRECHT FALK.

References Cited in the file of this patent

UNITED STATES PATENTS

| Number | Name | Date |
|---|---|---|
| 521,064 | Weyde | June 5, 1894 |
| 1,456,954 | Lucken | May 29, 1923 |
| 1,528,021 | Janzer | Mar. 3, 1925 |